United States Patent
Bade et al.

(10) Patent No.: US 6,834,969 B2
(45) Date of Patent: Dec. 28, 2004

(54) HEATED MIRROR

(75) Inventors: Yves Bade, Auxerre (FR); Daniel Dumont, Veneux-les-Sablons (FR); Bernard Duroux, Garancières (FR)

(73) Assignee: Schefenacker Vision Systems France S.A., Dammarie-les-Lys Cedex (FR)

( * ) Notice: Subject to any disclaimer, the term of this patent is extended or adjusted under 35 U.S.C. 154(b) by 139 days.

(21) Appl. No.: 10/161,321

(22) Filed: May 31, 2002

(65) Prior Publication Data

US 2003/0223136 A1 Dec. 4, 2003

(Under 37 CFR 1.47)

(51) Int. Cl.7 .............................................. G02B 11/04
(52) U.S. Cl. ...................... 359/507; 359/883; 219/219
(58) Field of Search ................. 359/507, 512, 359/838, 883; 219/219

(56) References Cited

U.S. PATENT DOCUMENTS 5,566,031 A    10/1996  Meyr et al.
5,717,190 A  *  2/1998  Inoue .......................... 219/522
5,724,187 A  *  3/1998  Varaprasad et al. ......... 359/608
5,990,449 A    11/1999  Sugiyama et al.

FOREIGN PATENT DOCUMENTS

| DE | 2645231 A1 | 4/1978 |
| DE | 19860941 A1 | 7/2000 |
| EP | 0677434 A1 | 10/1995 |
| FR | 2695789 A1 | 3/1994 |
| WO | WO 99/62303 | 12/1999 |

* cited by examiner

Primary Examiner—Mark A. Robinson
(74) Attorney, Agent, or Firm—Warn, Hoffman, Miller & LaLone, P.C.

(57) ABSTRACT

A heated mirror is provided. The mirror includes a plastic or glass substrate. A contact surface is provided for receiving a resistive heating layer. A plurality of spaced electrodes are electrically coupled to the resistive heating layer for inducing a current in the resistive heating layer to heat the mirror assembly. The substrate is polished in the direction of current flow through the resistive layer. The assembly may also include a separate reflective layer.

21 Claims, 4 Drawing Sheets

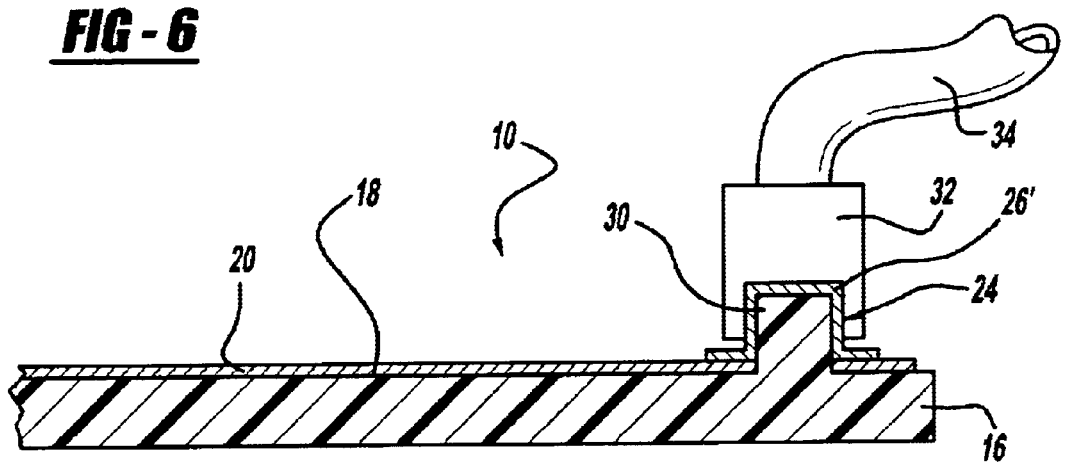
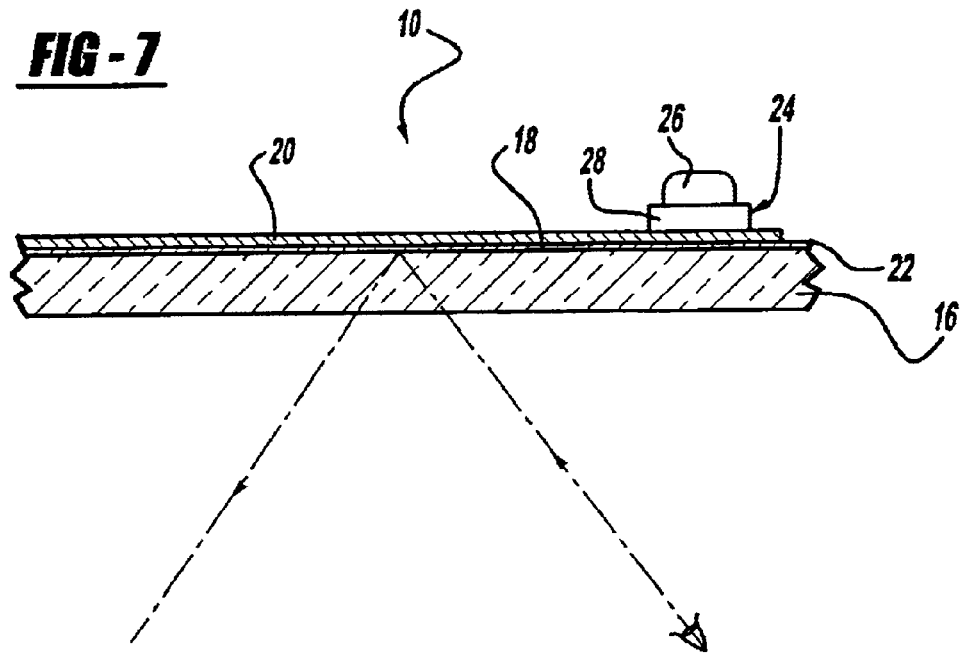

HEATED MIRROR

TECHNICAL FIELD

The present invention relates to a heated mirror. More specifically, the present invention relates to a mirror including resistive layer and pair of spaced electrodes for providing current to the resistive layer.

BACKGROUND OF THE INVENTION

Outside rear mirrors of vehicles can be affected by weather, and become clouded with water droplets, frost and ice, particularly in the winter months. The affect is to degrade the rearward viewing and, in turn, lowering driving safety. It is not uncommon for drivers to resort to the use of mechanical things, such as scrapers, towels, or the like to remove the frost and/or ice from the mirror until enough of the reflective surface of the mirror has been cleared.

In order to overcome this problem, heated mirrors have been introduced in the past. Conventional heated mirrors include a glass plate defining a suitable geometric shape for the mirror. A reflective layer is applied either at the front or rear part of the reflective layer. A resistive element is, in turn, fixed to the reflective layer by means of an adhesive film.

The resistive element usually consists of a coil formed by an electric conductor which is applied to the rear of the reflective surface and has, at its ends, terminals for connection to an electric power source. Heat is then generated to the Joule effect. However, the heat generation is not perfectly uniform and the mirror is heated by means of a transmission of the heat by conduction from the resistive element that generated it, through the reflective surface in the glass layer to the external surface to be demisted, defrosted or deiced. Accordingly, it is necessary to supply adequate electrical power to the resistive element for a certain time in order to produce the gradual heating of the entire volume of glass.

Other attempts for heating mirrors include providing a glass body which has a film of an electrically conductive metal disposed on one surface (a first surface or second surface) which also provides a reflective surface (on the first surface). Two conductive electrodes are associated with the film to induce an electric current in the film to therefore heat the conductive material to produce enough energy to demist, defog, or deice the mirror assembly. Such a mirror is shown, for example, in PCT Published Application WO 99/62303 published Dec. 2, 1999 (Feb. 12, 1999).

Similarly, a heated mirror including a resistive film having a pair of electrodes is shown in U.S. Pat. No. 5,990,449 to Sugiyama, et al.

SUMMARY OF THE INVENTION

According to one aspect of the present invention, there is provided a mirror assembly comprising a substrate including a contact surface. A resistive heating layer is disposed on the contact surface of the substrate. A plurality of spaced electrodes are attached to the resistive heating layer. The spaced electrodes are adapted to induce a current on the resistive layer between the electrodes. The substrate is polished in the direction of current flow between the electrodes.

According to another aspect of the present invention, there is provided a mirror assembly comprising a plastic body defining front and rear surfaces. A resistive heating layer is disposed on the rear surface of the plastic body. A reflective surface is disposed on the front surface of the plastic body. A plurality of spaced electrodes are secured to the heating layer. The spaced electrodes are adapted to induce a current in the heating layer between the electrodes.

According to another aspect of the present invention, there is provided a mirror assembly comprising a plastic body defining front and rear surfaces. The resistive heating layer is disposed on the front surface of the plastic body. A reflective surface is disposed on the heating layer. A plurality of spaced electrodes are secured to the heating layer. The spaced electrodes are adapted to induce a current on the heating layer between the electrodes.

According to yet another aspect of the present invention, there is provided a method of constructing a mirror comprising the steps of obtaining a substrate having front and rear surfaces. A contact surface of the substrate is polished in the direction of current flow. A resistive layer is deposited on the rear surface of the substrate. A plurality of spaced electrodes are attached to the heating layer. The spaced electrodes are adapted to induce a current on the heating layer between the electrodes in the direction of the polishing of the contact surface.

BRIEF DESCRIPTION OF THE DRAWINGS

Other aspects of the present invention will be readily appreciated as the same becomes better understood by reference to the following detailed description when considered in connection with the accompanying drawings wherein:

FIG. 6 is cross-sectional view, partially broken away, showing another embodiment of the present invention;

FIG. 7 is a cross-sectional view of another embodiment of the present invention.

DETAILED DESCRIPTION OF THE DRAWINGS

A mirror assembly is generally shown at 10 in the Figures. The mirror assembly 10 includes a housing 12 which is attached to the door 14 of a vehicle. While the mirror assembly 10 is shown attached to the door 14 of the vehicle, it will be appreciated that the mirror assembly 10 can be connected to other support structures on the vehicle. Further the mirror assembly can be connected to an interior support structure on the vehicle, such as for example, the windshield.

Figure 1:
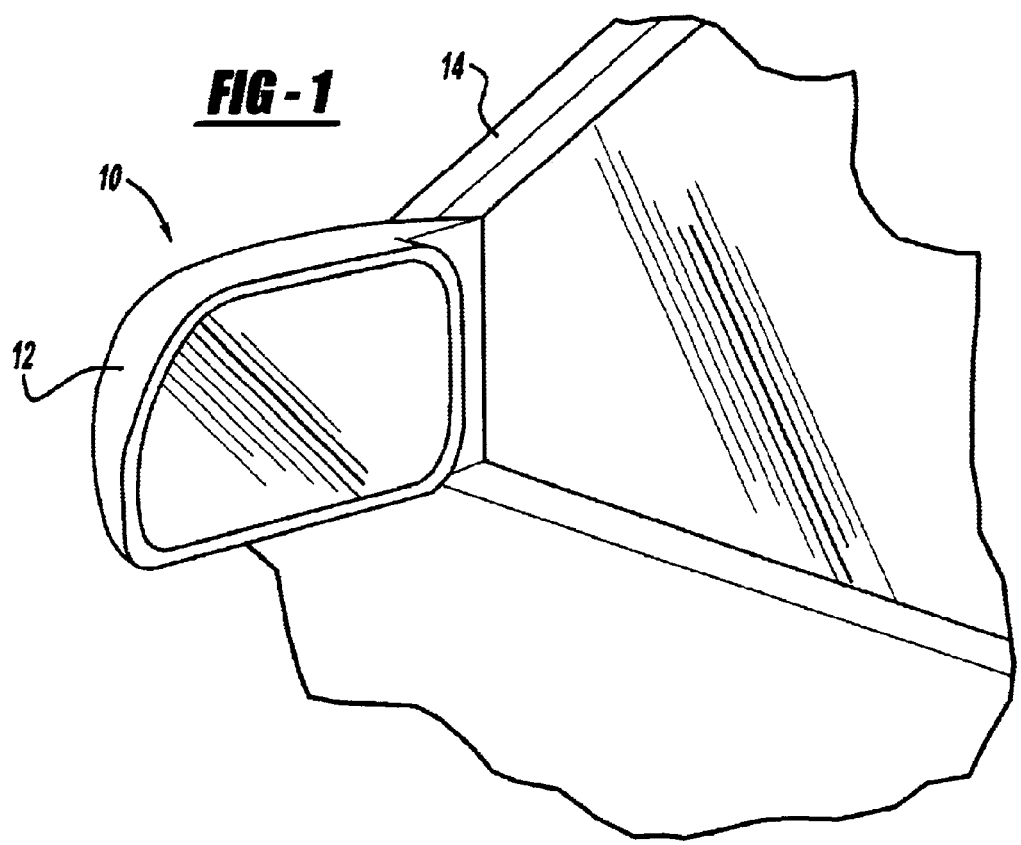
FIG. 1 is a perspective view, partially broken away, showing a rear view mirror on a vehicle.
Figure 2:
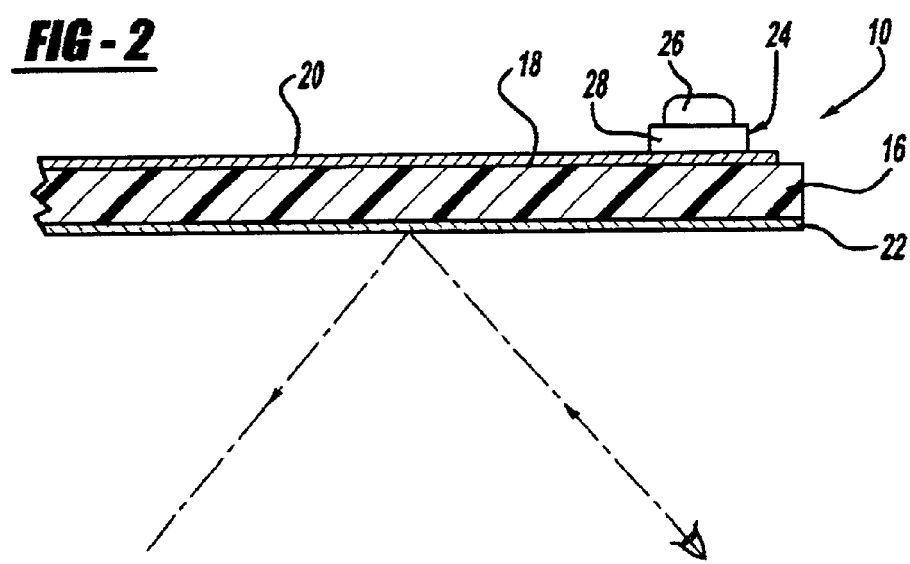
FIG. 2 is a cross-sectional view of the mirror assembly, without the housing, of one embodiment of the present invention.

The mirror assembly includes a substrate 16. The substrate 16 preferably comprises a plastic body. Alternatively, the substrate 16 may comprise a glass body. While the substrate 16 is shown to be planar, it will be appreciated that the substrate 16 can also be curved. The substrate 16 defines a contact surface 18. The contact surface 18 is on one side of the substrate 16 and is adapted for receiving a resistive heating layer 20. As best shown in FIGS. 2, 6 and 7, the contact surface 18 is on the rear most side of the substrate 16. It will be understood that the contact surface 18 and hence its resistive layer 20 can also The resistive heating layer 20 is preferably metallic. The heating layer 20 preferably comprises titanium or nickel or an alloy of either titanium or nickel with silver and aluminum. The resistive heating layer 20 is deposited on the substrate 16 utilizing any conventional physical or chemical processes or a combination of both. Such processes may include sputtering or vacuum vapor deposition. It will also be appreciated that the resistive material in the resistive heating layer 20 may be combined with a current limiter to reduce any effect of over voltage.

The mirror assembly 10 may also include a reflective layer 22. The reflective layer 22 may comprise any suitable reflective material placed on the substrate 16. In certain embodiments, such as, for example, as shown in FIG. 7, the reflective layer 22 may be interposed between the contact surface 18 and the resistive heating layer 20. In this way, the resistive heating layer 20 acts on the substrate 16 through the reflective layer 22. Similarly, if the contact surface 18 and resistive heating layer 20 are placed on the front side of the substrate 16, an additional reflective layer may be formed over the resistive heating layer 20 as shown in FIG. 8.

In one presently preferred embodiment as shown in FIG. 2, the reflective layer 22 is disposed on one side, the front side, of the substrate 16 and the resistive heating layer is disposed on the opposite side, the rear side, of the substrate 16. In yet another presently preferred embodiment as shown in FIG. 6, the reflective heating layer 20, itself, provides the reflective surface. That is, the resistive layer 20 constitutes the reflective surface and simultaneously acts as a resistive heating element. While the resistive layer 20 is shown on the rear of the substrate 16, it may also be located on the front side of the substrate 16.

FIG. 7 shows yet another presently preferred embodiment of the present invention. In this embodiment, the contact surface 18 is on the rear side of the substrate 16. The reflective layer 22 is disposed on the contact surface 18 and the resistive heating layer 20 is disposed on the reflective layer 22. In this manner, the resistive heating layer 20 act on the substrate 16 through the reflective layer 22.

Figure 8:
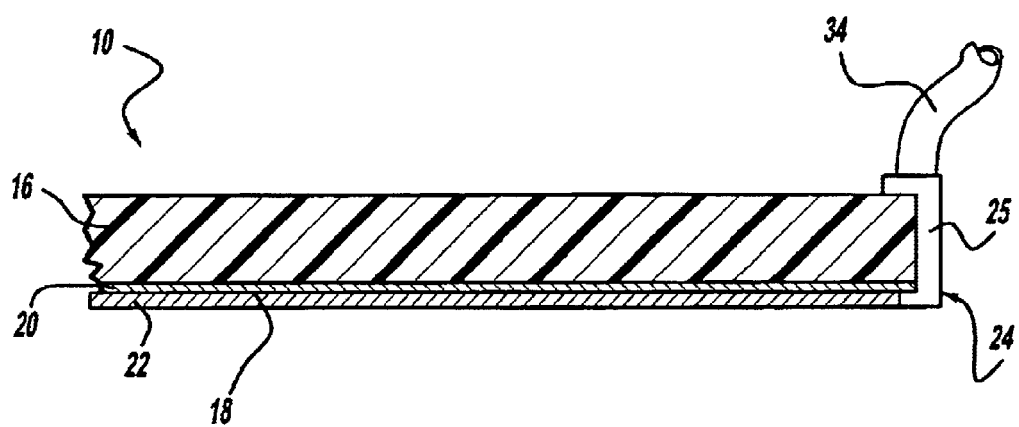
FIG. 8 is a cross-sectional view partially broken away, showing another embodiment of the present invention.

FIG. 8 shows yet another presently preferred embodiment of the present invention. As shown, the resistive heating layer 20 and any reflective layer 22 are disposed on the front side of the substrate 26. That is, the contact surface 18 is on the front side of the substrate 16 and the resistive heating layer 20 is disposed on the contact surface 18. In some embodiments, a reflective layer 22 may then be disposed on the resistive heating layer. As in other embodiments discussed above, the resistive heating layer 20 may also comprise the reflective layer. That is, a separate reflective layer 22 may not be present.

The mirror assembly 10 also includes a plurality of spaced electrodes generally indicated at 24. The spaced electrodes 24 are adapted to induce a current through the resistive heating layer between the electrodes 24. As best seen in FIGS. 2 and 7, one preferred method of connecting the electrode 24 to the resistive heating layer 20 is by connecting a suitable metallic electrode portion 26 through a negative temperature co-efficient (NTC) material 28 connected directly to the resistive heating layer 20. In this manner, the electrode portion 26 of the embodiment shown in FIGS. 2 and 7 is electrically coupled to the resistive heating layer 20. NTC materials are well known in the art. Alternatively, and as shown in FIG. 6, the substrate 16 may have an integrally formed electrode attachment portion 30. This integrally formed electrode attachment portion 30 is preferably molded into a plastic substrate 16 at the time the substrate 16 is formed. That is, the substrate 16 and electrode attachment portion are integrally formed in one operation. An electrode portion 26' is then secured over the electrode attachment portion 30 of the substrate 16 and is electrically coupled to the resistive heating layer 20. The electrode portion 26' of the FIG. 6 embodiment may comprise a thin metal strip which is applied over the electrode attachment portion 30 and secured to the resistive heating layer 20. Preferably, the electrode portion 26,26' material is copper, nickel, or a combination of copper and nickel.

Figure 3:
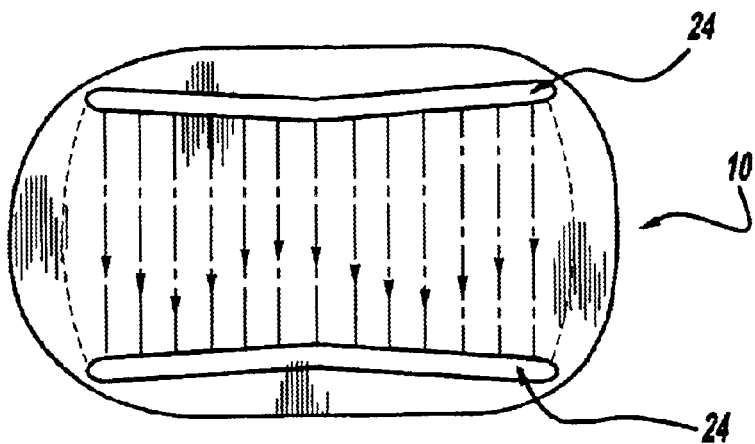
FIG. 3 is a plan view of a mirror assembly showing the electrodes, and the direction of polishing of the substrate surface.
Figure 4:
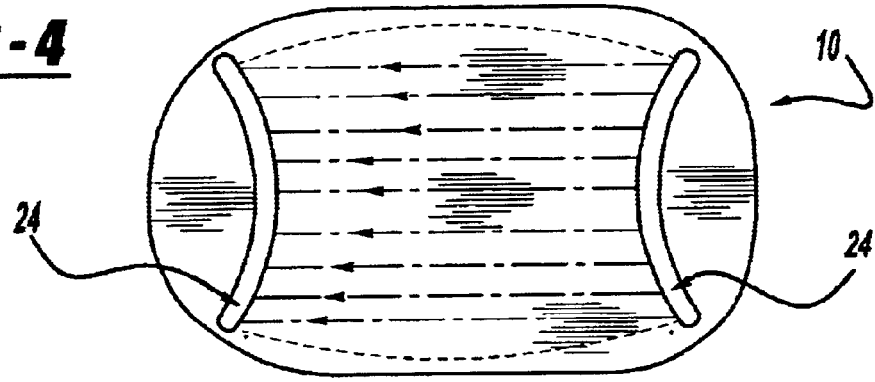
FIG. 4 is a plan view showing a different electrode configuration and the direction of polishing of the substrate surface.
Figure 5:
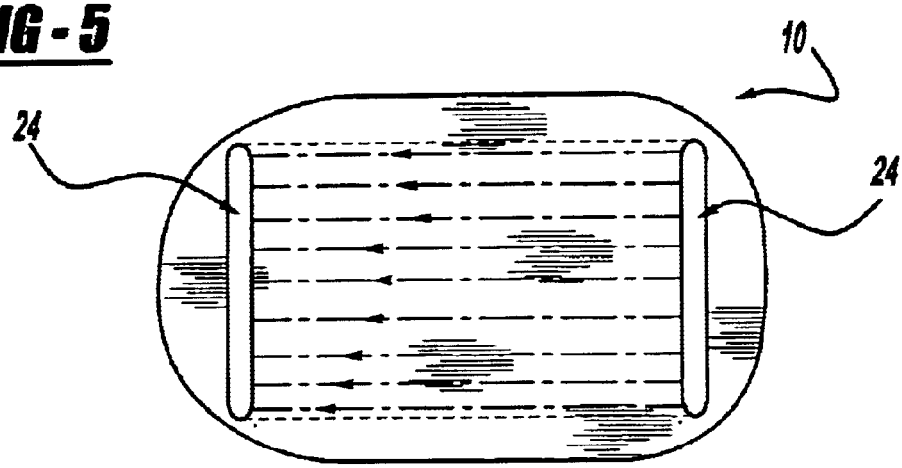
FIG. 5 is a plan view showing yet another electrode configuration and the direction of polishing of the substrate surface.

As best seen in FIGS. 3–5, the electrodes are elongated and disposed at the peripheral edges of the mirror. In some embodiments, such as those shown in FIGS. 4 and 5, the electrodes are placed at the outer sides the substrate 16. Alternatively, and as shown in FIG. 3, the electrodes may be placed at the upper and lower peripheral edges of the mirror assembly 10. The electrodes 24, and specifically the electrode portions 26,26' are connected to an electrical power source such as the battery of the vehicle. A suitable connector 32 fixed to a wire 34 is used to make the electrical connection between the vehicle battery and the electrode 24.

In the embodiment shown in FIG. 8, the electrode 24 comprises a suitable clip connector 25 to electrically couple the electrode with the battery clip. The clip connector 25 may be secured about the peripheral edges of the substrate 16. A wire 34 is use to make the electrical connection between the vehicle battery and the electrode 24.

The electrodes 24 connect to the resistive heating layer 20 and allow a flow of current through the resistive heating layer 20 causing heat to be generated in the resistive heating layer due to the Joule affect. The requisite current-to-heat by the Joule effect circulates in the resistive layer 20 by virtue of the opposing dual electrodes which are fed by an electric generator, such as the vehicle battery. It will be appreciated that the electric generator could have either an alternate or direct current of suitable voltage.

The two electrodes 24 are set at a distance so that the local current density corresponds at the required power. The resistivity and the thickness of the resistive heating 20 being preferably constant, and feeding of a fixed voltage, the local current will be inversely proportional to the distance between the electrodes 24. Thus, changes to the shape of the electrodes allow selective heating across the resistive layer 20.

Examples of these different types of electrodes are shown in FIGS. 3–5. As best seen in FIG. 3, a generally triangular shape allows for linear variation to obtain a maximal power in the median axis with a linear decrease of current at the outboard ends of the electrodes 24.

As best seen in FIG. 4, a generally arcuate shape maximizes the heating effect in the central area and decreases sinusoidaly toward the outboard ends of the electrodes 24.

As shown in FIG. 5, layer electrodes 24 are linear providing a uniform heating across the resistive layer 20. Thus, the electrodes 24 are set in order to optimize the heating across the resistive layer 20 to allow the desired heating of the mirror assembly 10.

The heat generated in the resistive layer 20 is sufficient to the heat the substrate 16 and any reflective layer 22 to minimize the effects of icing or fogging on the mirror assembly 10. It is preferred that the resistive layer 20 and power applied thereto, be applied such that the resistive heating layer 20 will provide and operate at temperature from between 25 and 60 degrees Celsius against the outside temperature. Further, if the temperature reached by the mirror during operation is higher than the temperature that is sufficient for defrosting or deicing, it is possible to provide the mirror with a temperature sensor (not shown) so that the device, by acting on the conductive terminals, limits the electric power supply so that the temperature remains substantially constant at the intended value.

In the presently preferred embodiments of the present invention, the substrate 16, and preferably the contact surface 18 of the substrate 16, is polished in the direction of current flow between the electrodes 24. This is denoted by the arrows in FIGS. 3–5. If the contact surface 20 is not polished in the direction of the electrical current, the roughness of the contact surface 18 may cause the resistive heating layer 20 to overheat and potentially burn out. Polishing of the substrate, particularly the contact surface 18 of the substrate in the direction of the current flow, substantially reduces this effect.

In order to make a mirror assembly, a body or substrate 16 having front and rear surfaces is obtained. The rear surface of the body is polished in one direction, corresponding to the expected direction of current flow between electrodes 24. A resistive heating layer 20 is then deposited on the contact surface 18 of the substrate 16. A plurality of spaced electrodes 24 then attached to the resistive heating layer 20 to induce a current through the resistive heating layer 20 between the electrodes 24 and, in the direction of the polishing of the contact surface 18.

Finally, a reflective coating may be deposited on the substrate, on the opposite side of the contact surface 18.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A mirror assembly comprising:
   a substrate including a first side;
   a resistive heating layer operably disposed on said first side of said substrate;
   a plurality of spaced electrodes attached to said resistive heating layer, said spaced electrodes adapted to induce a current through said resistive heating layer between said electrodes; and wherein
   said substrate is polished in the direction of current flow between said electrodes.

2. A mirror as set forth in claim 1 further comprising a reflective layer operably disposed on said substrate.

3. A mirror as set forth in claim 2 wherein each of said electrodes comprises a metal strip.

4. A mirror as set forth in claim 3 further comprising a negative temperature coefficient material attached to said substrate, said electrodes disposed on said negative temperature coefficient material.

5. A mirror as set forth in claim 3 wherein said electrodes are connected to an electrical power source.

6. A mirror as set forth in claim 1 further comprising a reflective layer disposed on said resistive layer.

7. A mirror as set forth in claim 6 wherein each of said electrodes comprises a metal strip.

8. A mirror as set forth in claim 7 further comprising a negative temperature coefficient material attached to said substrate, said electrodes disposed on said negative temperature coefficient material.

9. A mirror as set forth in claim 7 wherein said electrodes are connected to an electrical power source.

10. A mirror as set forth in claim 1 wherein said resistive heating layer includes a reflective surface.

11. A mirror as set forth in claim 10 wherein each of said electrodes comprises a metal strip.

12. A mirror as set forth in claim 11 further comprising a negative temperature coefficient material attached to said substrate, said electrodes disposed on said negative temperature coefficient material.

13. A mirror as set forth in claim 11 wherein said electrodes are connected to an electrical power source.

14. A mirror assembly as set forth in claim 1 wherein said substrate comprising a plastic mirror body.

15. A mirror assembly as set forth in claim 1 wherein said substrate comprising a glass mirror body.

16. A mirror assembly comprising:
   a substrate including a contact surface;
   a reflective layer disposed on said contact surface;
   a resistive heating layer disposed on said reflective layer;
   a plurality of spaced electrodes attached to said resistive heating layer, said spaced electrodes adapted to induce a current through said resistive heating layer between said electrodes; and wherein
   said substrate is polished in the direction of current flow between said electrodes.

17. A mirror as set forth in claim 16 wherein said substrate comprises a plastic mirror body.

18. A mirror as set forth in claim 16 wherein said substrate comprises a glass mirror body.

19. A method of constructing a mirror comprising the steps of:
   obtaining a substrate having front and rear surfaces;
   polishing a contact surface of the substrate in one direction for current flow;
   depositing a resistive heating layer on said contact surface of said substrate; and
   attaching a plurality of spaced electrodes to said heating layer, said spaced
   electrodes adapted to induce a current through said heating layer between said
   electrodes and in the direction of the polishing of the contact surface.

20. A method as set forth in claim 19 further comprising the step of depositing a reflective coating on the opposite surface of the substrate.

21. A method as set forth in claim 19 wherein the substrate is formed of plastic.

* * * * *